US009143832B2

(12) United States Patent
Newell et al.

(10) Patent No.: US 9,143,832 B2
(45) Date of Patent: Sep. 22, 2015

(54) CUSTOMIZED CONTENT CALENDAR

(71) Applicant: EchoStar Technologies L.L.C., Englewood, CO (US)

(72) Inventors: Nicholas Brandon Newell, Highlands Ranch, CO (US); Omar Azam Khan, Englewood, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 21 days.

(21) Appl. No.: 13/975,058

(22) Filed: Aug. 23, 2013

(65) Prior Publication Data

US 2015/0058873 A1    Feb. 26, 2015

(51) Int. Cl.
  *H04N 5/445*     (2011.01)
  *H04N 21/472*    (2011.01)
  *H04N 21/433*    (2011.01)
  *H04N 21/442*    (2011.01)
  *H04N 21/488*    (2011.01)
  *H04N 21/2665*   (2011.01)
  *H04N 21/462*    (2011.01)
  *H04N 21/262*    (2011.01)
  *H04N 21/45*     (2011.01)
  *H04N 21/258*    (2011.01)

(52) U.S. Cl.
  CPC ... *H04N 21/47214* (2013.01); *H04N 21/25891* (2013.01); *H04N 21/2665* (2013.01); *H04N 21/26283* (2013.01); *H04N 21/4334* (2013.01); *H04N 21/44222* (2013.01); *H04N 21/4532* (2013.01); *H04N 21/4622* (2013.01); *H04N 21/4882* (2013.01)

(58) Field of Classification Search
  CPC .......... H04N 21/431; H04N 21/44222; H04N 21/47214; H04N 21/482
  See application file for complete search history.

(56) References Cited

U.S. PATENT DOCUMENTS

| | | | |
|---|---|---|---|
| 6,792,197 B1* | 9/2004 | Helmstetter | 386/291 |
| 8,543,516 B2* | 9/2013 | Aravamudan et al. | 706/11 |
| 2002/0133821 A1* | 9/2002 | Shteyn | 725/46 |
| 2002/0138843 A1* | 9/2002 | Samaan et al. | 725/87 |
| 2003/0086694 A1* | 5/2003 | Davidsson | 386/83 |
| 2003/0118014 A1* | 6/2003 | Iyer et al. | 370/389 |
| 2003/0145326 A1* | 7/2003 | Gutta et al. | 725/46 |
| 2003/0159150 A1* | 8/2003 | Chernock et al. | 725/58 |
| 2006/0059521 A1* | 3/2006 | Lee et al. | 725/58 |
| 2007/0204308 A1* | 8/2007 | Nicholas et al. | 725/86 |
| 2008/0091718 A1* | 4/2008 | Barsness et al. | 707/104.1 |
| 2008/0263596 A1* | 10/2008 | Kim et al. | 725/40 |
| 2009/0044216 A1* | 2/2009 | McNicoll | 725/5 |
| 2009/0300694 A1* | 12/2009 | Campagna et al. | 725/106 |
| 2009/0327182 A1* | 12/2009 | Chakravarty et al. | 706/45 |
| 2010/0037277 A1* | 2/2010 | Flynn-Ripley et al. | 725/110 |
| 2011/0126251 A1* | 5/2011 | LaFreniere et al. | 725/110 |
| 2013/0110947 A1* | 5/2013 | Boukadakis et al. | 709/206 |

\* cited by examiner

*Primary Examiner* — Pankaj Kumar
*Assistant Examiner* — Timothy Newlin
(74) *Attorney, Agent, or Firm* — Kilpatrick Townsend & Stockton LLP

(57) ABSTRACT

A customized content calendar may include reminders or invitations to access particular media content, where the reminders or invitations may be pushed to the content calendar based on user-specific preferences.

20 Claims, 7 Drawing Sheets

CUSTOMIZED CONTENT CALENDAR

BACKGROUND

"What's on TV?" is a phrase regularly echoed across multitudes of households. When made available, an electronic programming guide may provide an answer to that question, by allowing users to browse through current and future channel-specific listings. Some individuals though may desire an alternate way for identifying and interacting with content available for viewing.

SUMMARY

This summary does not in any way limit the scope of claimed subject matter.

In an aspect, a method for adding an event to a cloud-based calendar is disclosed. The method may include or comprise receiving a calendar synchronization communication, where the calendar synchronization communication may include at least one unscheduled time period. In general, it is contemplated that a calendar synchronization communication may take the form of a message, and a particular unscheduled time period may represent or otherwise correspond to a duration of time of or within that cloud-based calendar that does not include an existing entry. The method may further include or comprise identifying a piece of content having a playback time that is not greater than a particular unscheduled time period of or within the cloud-based calendar. In general, it is contemplated that a piece of content may take the form of audio and/or video that has a particular length or duration that is less than or at least equal to the particular unscheduled time period, so that a potential calendar event associated with the piece of content would not overlap with any other event of or within the cloud-based calendar. Other embodiments are possible. For example, if the piece of content is by some mechanism determined to be of priority or have at least some potential importance or significance to an individual associated with the cloud-based calendar, that piece of content might still be identified from among other content. The method may further include or comprise creating a calendar event for the piece of content, where the calendar event is based on the piece of content and the playback time. In general, it is contemplated that a created calendar event may include one or more of a particular duration that may be associated with playback time of the piece of content, start date/time, and end date/time, and possibly other information such as a description of the piece of content itself and/or other information that is relevant or germane to the piece of content. Such information may only be limited by the one or more sources used to draw such information from. The method may further include or comprise causing the calendar event to be added to the cloud-based calendar. In general, it is contemplated that the calendar event when added to the cloud-based calendar may treated much like any other type of event added to the cloud-based calendar. For example, the calendar event may be forwarded to other individuals or calendars as desired, may be modified so that the calendar event includes other data or information, may be categorized according to any particular scheme, may be designated as "high" importance or perhaps "low" importance, may be "deleted," and etc., where such features or functionality may be implementation-specific to the software or service associated with the cloud-based calendar, and may evolve as technology evolves.

Additionally, or alternatively, the method may include or comprise receiving, from a content provider, a personal video invitation corresponding to the piece of content and causing the personal video invitation to be added to the cloud-based calendar as part of the calendar event. As discussed throughout, such an invitation may be a message from a person, such as an actress, actor, or director from a movie, or just a friend who believes the user might find certain content interesting, that "invites" the user to access the piece of content included in the calendar event. Other embodiments are possible.

Additionally, or alternatively, the method may include or comprise receiving user preferences, where the user preferences comprise one or more recurring candidate time periods during which a user desires to watch content. As discussed throughout, such user preferences may be user-specific, and may be used or otherwise leveraged as a tool to schedule calendar events according to user preferences. Other embodiments are possible. For example, in some embodiments, an unscheduled time period may overlap a candidate time period of the one or more recurring candidate time periods.

Additionally, or alternatively, the method may include or comprise selecting the piece of content from one of: broadcast content; non-television content; and on-demand content. As discussed throughout, it is contemplated that a piece of content may generally include any type of media content, where the piece of content may include particular content based on specifics of implementation. In this manner, the principles of the present disclosure may be applicable to many different types of media content distribution systems. Other embodiments are possible.

Additionally, or alternatively, the method may include or comprise, in response to causing the calendar event to be added to the cloud-based calendar, receiving a response to the calendar event, and causing a television receiver to record the piece of content based on the response to the calendar event. As discussed throughout, one example implementation may include a satellite television distribution system, and it is contemplated that features and functionality offered by a television receiver in such an implementation may be leveraged or accessed through a calendar or calendar event configured and/or arranged as discussed within the context of the present disclosure. For example, a recording feature of television receiver may be instantiated based on a response to a calendar event. Other embodiments are possible.

Additionally, or alternatively, the method may include or comprise, in response to causing the calendar event to be added to the cloud-based calendar, receiving a response to the calendar event, and causing a television receiver to output for presentation the piece of content based on the response to the calendar event. As discussed throughout, one example implementation may include a satellite television distribution system, and it is contemplated that features and functionality offered by a television receiver in such an implementation may be leveraged or accessed through a calendar or calendar event configured and/or arranged as discussed within the context of the present disclosure. For example, content may be output by a television receiver for presentation by a display device based on a response to a calendar event. Other embodiments are possible.

In an aspect, a method for creating a calendar event is disclosed. The method may include or comprise comparing metadata associated with particular television programming against user-specific preferences for scheduling television programming-related calendar events. In general, is contemplated that the metadata may include any type of descriptor that captures or specifies a characteristic of the television programming itself as well as any type of descriptor that captures or specifies a characteristic of the content of the television programming. For example, the metadata may include duration of the television programming, as well as rating of the television programming, actors associated with the television programming, and etc. Additionally, the scheduling of a television programming-related calendar event may serve as reminder or suggestion to a particular user to tune-in to, access, etc., a particular piece of television programming at or during a time associated with a corresponding calendar event. The method may further include or comprise assigning, based on the comparing, a ranking value to the particular television programming. In general, is contemplated that the metadata for the television programming may be compared to the user-specific preferences to determine whether or not the television programming would be a good match for a particular user that is matched to the user-specific preferences, and based on the comparison a quantitative parameter such as a score for example may be assigned to the television programming. The method may further include or comprise creating a calendar event for the particular television programming when the ranking value at least exceeds a particular threshold value, where duration of the calendar event is based on duration of the particular television programming. In general, it is contemplated that the calendar event may be created when the ranking value exceeds a configurable threshold value, where the threshold value itself may be user-specific and defined by a content provider for example, the particular user that is matched to the user-specific preferences, and/or possibly another entity such as a third party, so that at least some assurance may be made that the television programming as recommended via the calendar may likely be a good match for the particular user that is matched to the user-specific preferences.

Additionally, or alternatively, the method may include or comprise, adding the calendar event to a particular cloud-based calendar upon detecting an acceptance of a calendar invite that is associated with the calendar event. As discussed throughout, populating a calendar with a particular calendar event may be optional. For example, a calendar invite may be sent for user-viewing, and the calendar event may or may not be stored to the cloud-based calendar based on user input, including for example whether or not a particular individual or user "accepts" the calendar invite. Other embodiments are possible.

Additionally, or alternatively, the method may include or comprise, scanning a particular cloud-based calendar for unscheduled time periods to schedule the calendar event based on the user-specific preferences. As discussed throughout, user preferences may be user-specific, and may be used or otherwise leveraged as a tool to schedule calendar events according to user preferences. Other embodiments are possible.

Additionally, or alternatively, the method may include or comprise, cataloging user-specific preference information based on input provided by a particular user. As discussed throughout, user preferences may be user-specific, and may be used or otherwise leveraged as a tool to schedule calendar events according to user preferences. In some embodiments, at least some of the user preferences for a particular user may be derived directly based on input received from the particular user. Other embodiments are possible.

Additionally, or alternatively, the method may include or comprise, cataloging user-specific preference information based on input provided by a television receiver that monitors programming selections. As discussed throughout, user preferences may be user-specific, and may be used or otherwise leveraged as a tool to schedule calendar events according to user preferences. In some embodiments, at least some of the user preferences for a particular user may be derived indirectly based on viewing habits of the particular user as measured or otherwise monitored by their television receiver. Other embodiments are possible.

Additionally, or alternatively, the method may include or comprise, sending a calendar invite that is associated with the calendar event and that requests acceptance of the calendar event. As mentioned above, populating a calendar with a particular calendar event may be optional. For example, a calendar invite may be sent for user-viewing, and the calendar event may or may not be stored to the cloud-based calendar based on user input, including for example whether or not a particular individual or user "accepts" the calendar invite. Other embodiments are possible.

Additionally, or alternatively, the method may include or comprise, generating a notification reminder for presentation by a display device at a time prior to broadcast of the television programming. In general, it is contemplated that such as a reminder may be used to provide advanced warning of a particular scheduled calendar event. For example, a notification reminder may generated for presentation by a display device at a time of 15 minutes prior to broadcast of particular television programming, so that a particular user is notified in advance of the broadcast of the particular television programming. Other embodiments are possible.

In an aspect, a computing system is disclosed that may include or comprise a display device, one or more processors, and a memory communicatively coupled with and readable by the one or more processors and having stored therein processor-readable instructions that, when executed by the one or more processors, cause the one or more processors to output for presentation by the display device a calendar that includes at least one calendar event to remind a particular individual of content made available by a television receiver at a time associated with the at least one calendar event. In general, it is contemplated that the computing system may be a user equipment, such as a smartphone, and a calendaring application on the smartphone may when accessed display a particular calendar event, possibly alongside or in tandem with traditional or conventional calendar events, to remind or otherwise provide as a recommendation to a particular individual that certain content made available by a television receiver that is associated with the particular individual may be accessed at a time associated with the particular calendar event. In general, the time associated with the particular calendar event may include between and including a start time of the content and an end time of the content.

Additionally, or alternatively, the memory may have stored therein processor-readable instructions which, when executed by the one or more processors, cause the one or more processors to output for presentation by the display device at least one detail associated with the content in response to selection of the at least one calendar event. In general, it is contemplated that a particular calendar event may have contained therein any of a number different types of information that may be accessed when the calendar event is selected. For example, the calendar event may include or specify one or more characteristics associated with the content, including indications of: actors, actresses, director, ratings, reviews, description, content duration, and/or any other characteristics of content as desired. Other embodiments are possible.

Additionally, or alternatively, the memory may have stored therein processor-readable instructions which, when executed by the one or more processors, cause the one or more processors to output for presentation by the display device a video clip associated with the content in response to selection of one of the at least one calendar event and a link contained within the at least one calendar event. In general, it is contemplated that a particular calendar event may have contained therein any of a number different types of information that may be accessed when the calendar event is selected. For example, selection of the calendar event may cause a video clip to play, or a link may be displayed that when selected may instantiate loading of a personal video invitation to play. Other embodiments are possible.

Additionally, or alternatively, the memory may have stored therein processor-readable instructions which, when executed by the one or more processors, cause the one or more processors to output for presentation by the display device the content made available by the television receiver at the time associated with the at least one calendar event. In general, it is contemplated that the content may be streamed or otherwise provided from the television receiver to the computing system so the content may be watched "live" at a time of broadcast of the content. Other embodiments are possible.

Additionally, or alternatively, the memory may have stored therein processor-readable instructions which, when executed by the one or more processors, cause the one or more processors to output for presentation by the display device the content made available by the television receiver at a time different than the time associated with the at least one calendar event. In general, it is contemplated that the content may be streamed or otherwise provided from the television receiver to the computing system so the content as recorded by the television receiver may be watched at any time and not necessarily at a time of broadcast of the content. Other embodiments are possible.

Additionally, or alternatively, the memory may have stored therein processor-readable instructions which, when executed by the one or more processors, cause the one or more processors to send a command to the television receiver to record the content at the time associated with the at least one calendar event. As discussed throughout, one example implementation may include a satellite television distribution system, and it is contemplated that features and functionality offered by a television receiver in such an implementation may be leveraged or accessed through a calendar or calendar event configured and/or arranged as discussed within the context of the present disclosure. For example, a recording feature of television receiver may be instantiated based on a response to a calendar event. Other embodiments are possible.

Although not so limited, an appreciation and understanding of such an example method for adding an event to a cloud-based calendar may be gained from the discussion provided by the detailed description in connection with the drawings.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Many people today maintain and regularly access digital calendars. In some instances such calendars may be cloud-based. A cloud-based calendar may be maintained by a remote server, as opposed to a personal computer for example, and may be accessed and interacted with from any of a number of different devices, such as a tablet computer, smartphone, desktop computer, etc. Someone using a cloud-based calendar may tend to add work-related events, personal events, and other items to their own cloud-based calendar. For example, meetings, appointments, and other forms of commitments or activities may be added over the course of a particular day. Such events may typically indicate a date and a time, and also include a description of a corresponding event.

It is contemplated that the ability to efficiently add events, in some instances referred to as calendar invites, related to media content to a cloud-based calendar may increase the likelihood that a particular individual will watch or at least listen to particular content. For example, a calendar event may make it more likely that someone will remember to watch and/or listen to a particular piece of content associated with the calendar event. In addition to allowing for the efficient addition of content-related calendar events, embodiments detailed herein may be used to recommend pieces of media content to a user. Such recommendations may take into account events the user has added to their cloud-based calendar. User preferences, such as time periods during which the user prefers to watch content, for example, may be taken into account when making recommendations. The recommendations may be added to the cloud-based calendar. Such recommendations may include a "personal invitation." A personal invitation may be a message from a person, such as an actress, actor, or director from a movie, or just a friend who believes the user might find certain content interesting, that "invites" the user to access the piece of content included in the calendar event.

Different actions may be taken in response to the calendar event. If the user declines, the calendar event may be removed from their cloud-based calendar. If the user accepts and the piece of content is broadcast content, the user may be able to specify whether or not the content should be recorded by their television receiver for example. Also, if the piece of content is being broadcast, the user may also be able to specify that the user will watch the event live. Such a response may result in the television receiver being configured to output the piece of content for presentation when the broadcast is scheduled to commence. The customized content calendar arrangement of the present disclosure may be implemented for various types of television service providers, including satellite-based, broadcast-based, IP packet-based, and cable-based television service providers.

Figure 1:
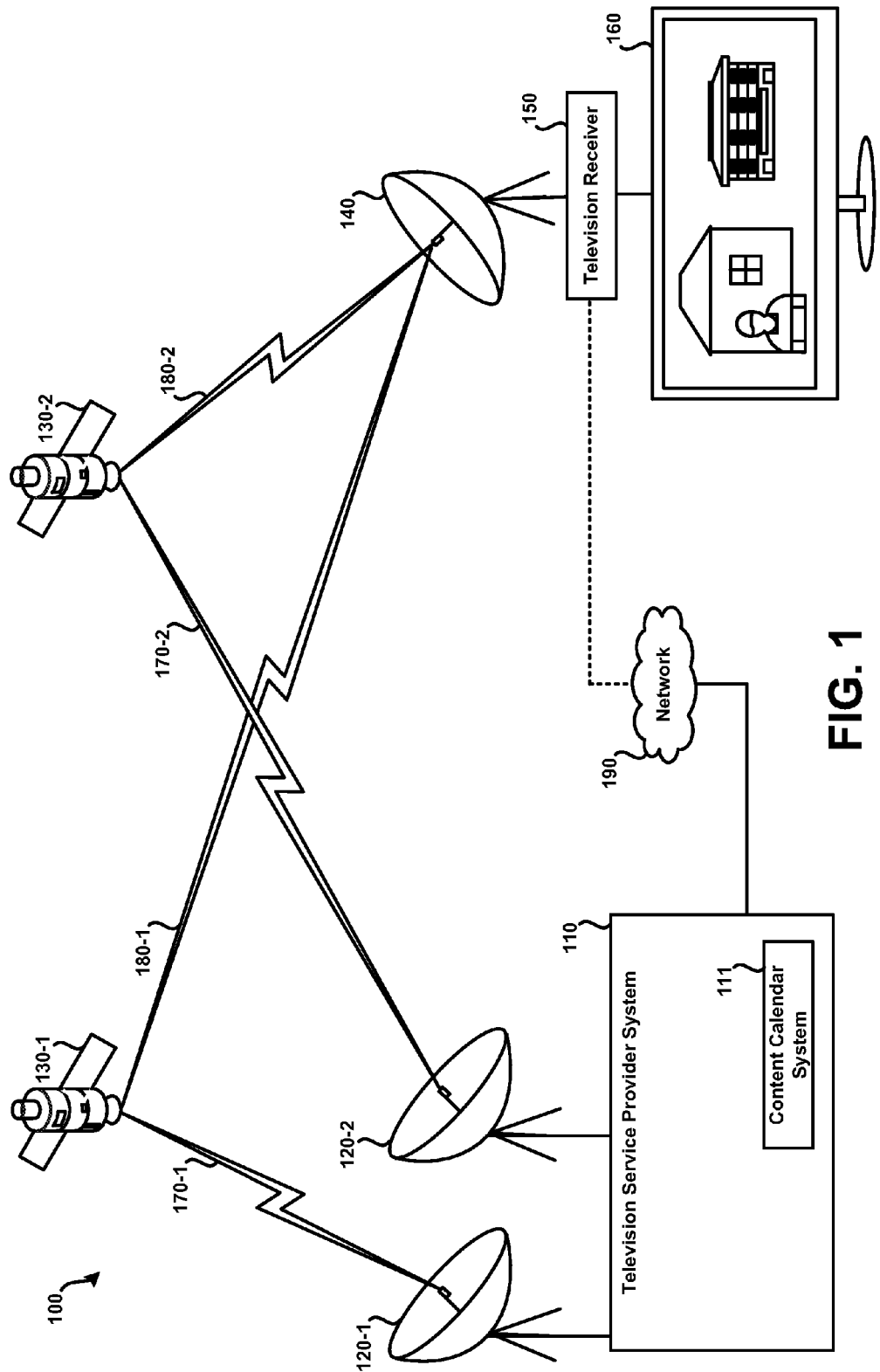
FIG. 1 shows an example satellite television distribution system.

For example, referring now to FIG. 1, an example satellite television distribution system 100 is shown in accordance with the present disclosure. Satellite television distribution system 100 may include: television service provider system 110, satellite transmitter equipment 120, satellites 130, satellite dish 140, television receiver 150, and display device 160.

Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 (120-1, 120-2) may be used to transmit a feed of one or more television channels from television service provider system 110 to one or more satellites 130 (130-1, 130-2). While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots. Television service provider system 110 may include content calendar system 111, embodiments of which are detailed in relation to content calendar system 300 of FIG. 3.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder streams 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box. Television receiver 150 may decode signals received via satellite dish 140 and provide an output to display device 160. A television receiver is defined to include set-top boxes and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Transponder stream 180-1 represents a transponder stream signal between satellite 130-1 and satellite dish 140. Transponder stream 180-2 represents a transponder stream signal between satellite 130-2 and satellite dish 140. Each of transponder streams 180 may contain one or more different television channels, which may be at least partially scrambled. For example, transponder stream 180-1 may be a first transponder stream containing a first group of television channels, while transponder stream 180-2 may be a second transponder stream containing a different group of television channels. When a television channel is received as part of a transponder stream and is decoded and output to display device 160, rather than first storing the television channel to a storage medium as part of DVR functionality then later outputting the television channel from the storage medium for example, the television channel may be considered to be viewed "live."

FIG. 1 illustrates transponder stream 180-1 and transponder stream 180-2 being received by satellite dish 140 and distributed to television receiver 150. For a first group of television channels, satellite dish 140 may receive transponder stream 180-1 and for a second group of channels, transponder stream 180-2 may be received. Television receiver 150 may decode the received transponder streams. As such, depending on which television channels are desired to be presented or stored, various transponder streams from various satellites may be received, descrambled, and decoded by television receiver 150.

Network 190 may serve as a secondary communication channel between television service provider system 110 and television receiver 150. However, in many instances, television receiver 150 may be disconnected from network 190, for reasons such as because television receiver 150 is not configured to connect to network 190 or a subscriber does not desire or cannot connect to network 190. As such, the connection between network 190 and television receiver 150 is represented by a dotted line. Bidirectional exchange of data may occur via such a communication channel. As such, data may be transmitted to television service provider system 110 from television receiver 150 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190. In some embodiments, audio and video services may also be provided to television receiver 150 via network 190.

Figure 2:
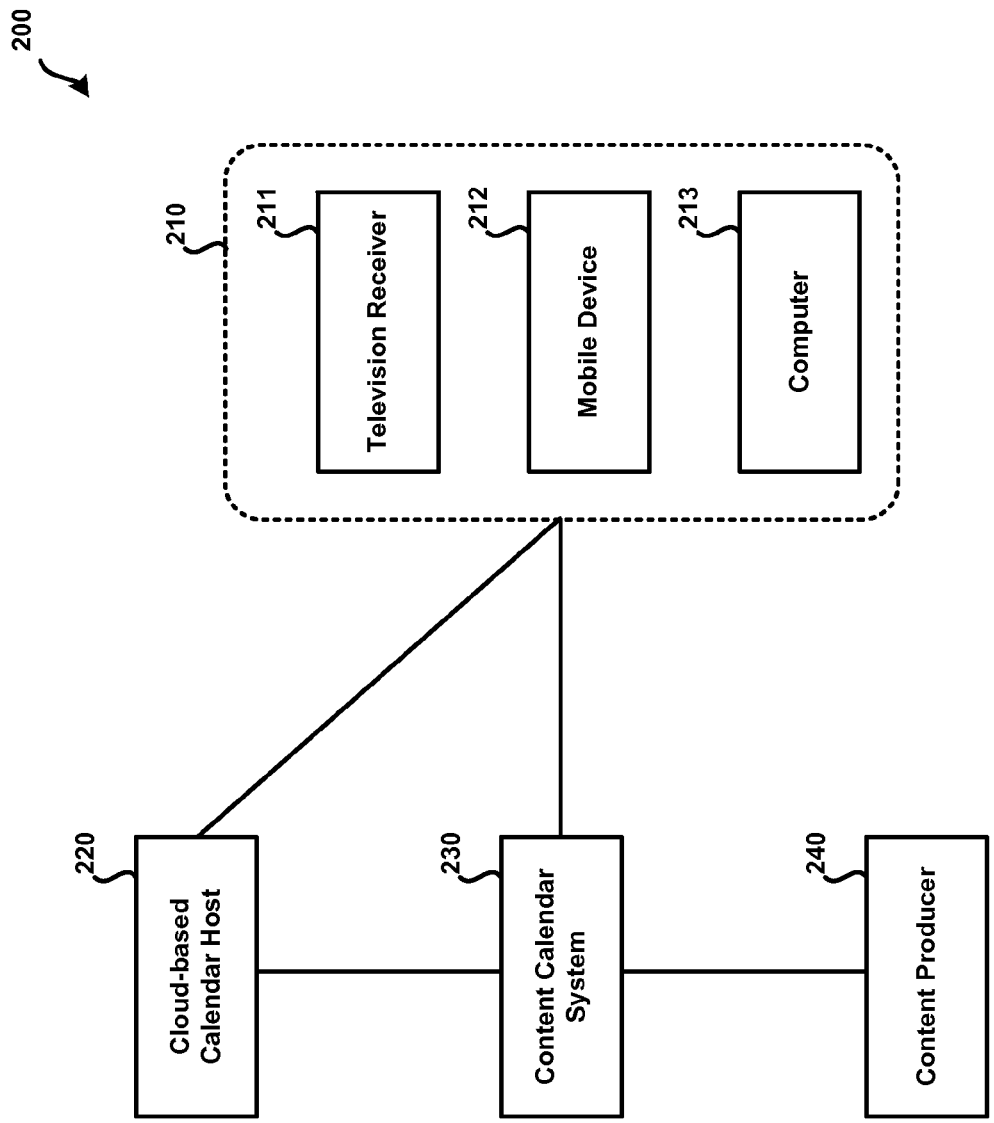
FIG. 2 shows an example cloud-based calendar entry system.

Referring now to FIG. 2, an example cloud-based calendar entry system 200 is shown in accordance with the present disclosure. In particular, the system 200 may be arranged and configured for recommending and adding cloud-based calendar entries. System 200 may include user devices 210 cloud-based calendar host 220, content calendar system 230, and content producer 240. Communication between cloud-based calendar host 220, content calendar system 230, content producer 240, and user devices 210 may involve the use of one or more networks such as, for instance, the Internet. Communication involving mobile device 212 may additionally involve a wireless network being used for communication. Additionally, content calendar system 230 may be part of television service provider system 110 of FIG. 1, or may be operated independently from television service provider system 110, such as by a third-party. Other embodiments are possible.

Cloud-based calendar host 220 may allow a user to maintain a calendar remotely from user devices 210. For example, cloud-based calendar host 220 may include one or more servers that are remote and separate from user devices 210, yet may be network-accessible. Cloud-based calendar host 220 may allow a user to login and access their calendar. Such a calendar may permit entries to be made for various events. Each calendar event may be at least be associated with a duration, a start time, and a stop time. Further, each calendar event may include a description and/or may be linked with multimedia content, such as video and/or audio. It is contemplated that video and/or audio may be linked with or incorporated in calendar events via hyperlink or by directly embedding the multimedia in the calendar event such that when the calendar event is presented to user, the multimedia is directly accessible.

A user may be permitted to interact with their cloud-based calendar via computerized devices that communicate with cloud-based calendar host 220 via a network, such as the Internet. For example, user devices 210 may include devices such as: television receiver 211, mobile device 212, and computer 213. Television receiver 211 may represent television receiver 150 of FIG. 1. As such, television receiver 150 may allow for a user to view and/or edit their own interactive calendar. Mobile device 212 can be various forms of wireless computerized device, such as: a smartphone, a tablet computer, a laptop computer, etc. Mobile device 212 may frequently be used to access a cloud-based calendar hosted by cloud-based calendar host 220. Additionally, computer 213, which may be a work or home desktop computer, for example, may be used to allow a user to perform various operations create, view, and edit a particular cloud-based calendar hosted by cloud-based calendar host 220. However, each of the user devices 210 may be used by the user to modify the user's calendar stored by cloud-based calendar host 220. Cloud-based calendar host 220 may also push out updates to a calendar for presentation to a user via user devices 210. As such, regardless of which particular user device of user devices 210 is used to view a cloud-based calendar, the same events can be expected to be indicated.

Content calendar system 230 may be granted permission to access cloud-based calendar host 220 for a particular user's calendar. The user may login to cloud-based calendar host 220 and provide an authorization for their cloud-based calendar to be shared with content calendar system 230. Once such authorization has been provided to cloud-based calendar host 220, content calendar system 230 may receive updates and/or may be able to access the cloud-based calendar directly from cloud-based calendar host 220. Accordingly, content calendar system 230 may be able to access calendar events that have been added to the cloud-based calendar of the example scenario. Additionally, content calendar system 230 may be permitted to add calendar events to the cloud-based calendar.

Content calendar system 230 may also be in communication with content producer 240. Content producer 240 may provide content, such as television show episodes, documentaries, movies, television specials, etc., to a content provider that is operating content calendar system 230. In addition to providing pieces of content, content producer 240 may provide personal invitations related to the pieces of content. For example, a particular piece of content may be a newly released movie that will be made available to subscribers of the television service provider, or other form of content provider, operating content calendar system 230. The personal invitation may for example be a video message that invites a particular user to view the piece of content. For example, the personal invitation may be a short video clip recorded of an actor or actress from the movie saying something similar to: "Hi, my name is John Horror. I think you'd really enjoy my new movie, 'Zombies II.' Please accept my invitation to watch it." For a single piece of content, multiple personal invitations may be recorded that are targeted to different audiences. For example, if it is known that the user watched the first movie in the series, a different message from the actor may be played as the personal invitation, such as: "I know you enjoyed 'Zombies I,' and the newest installment, 'Zombies II,' is twice as epic. Please accept my invitation watch it."

Content producer 240 may also provide metadata associated with the piece of content to content calendar system 230. The metadata may indicate various characteristics of the piece of content, such as: title, director, the and actresses appearing in the content, category of the content, rating of the content, temporal duration of the content, indications of other similar pieces of content, and etc. The piece of content, the one or more personalized invitations, and the metadata may be stored by content calendar system 230 or some other system of the television service provider operating content calendar system 230.

Figure 3:
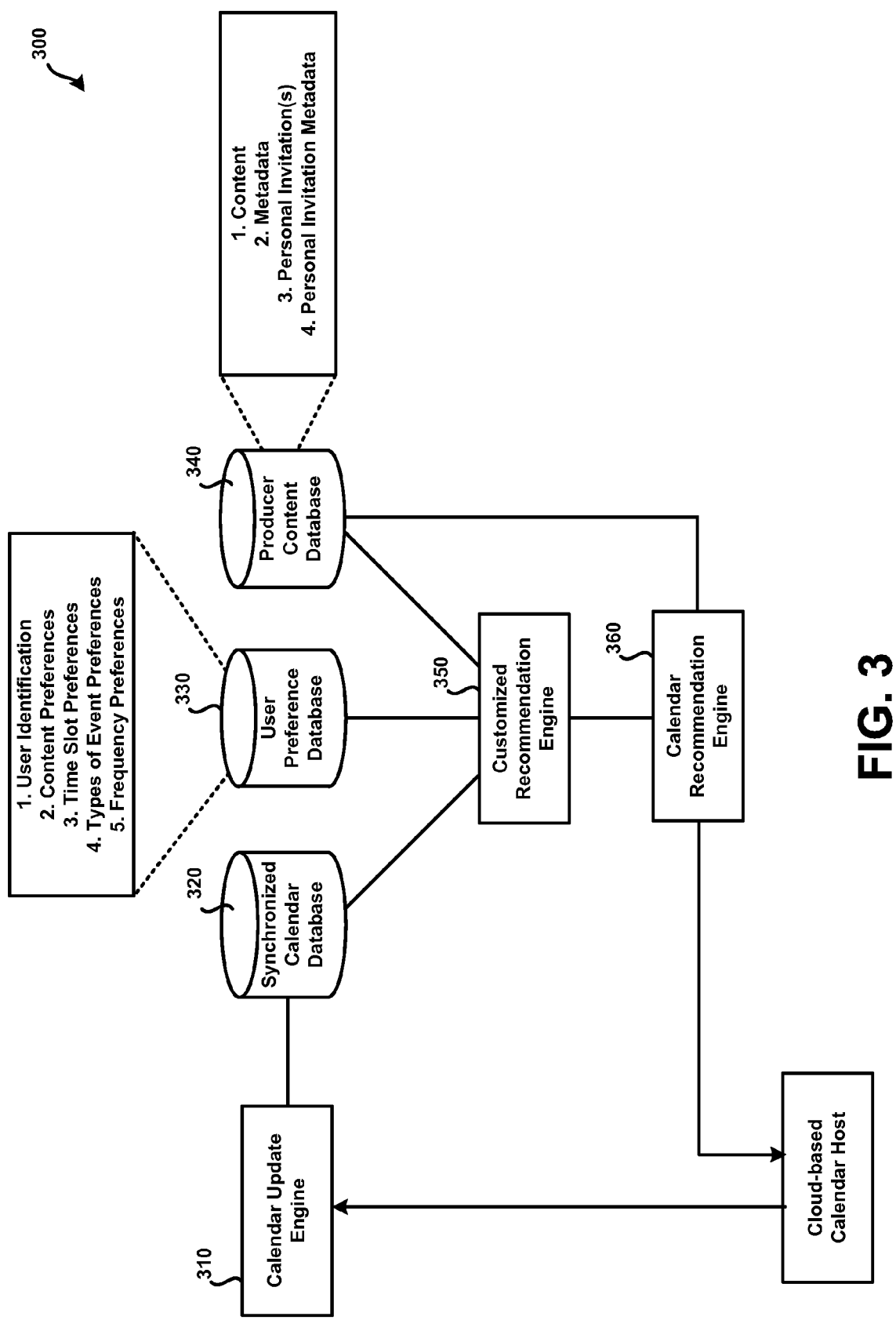
FIG. 3 shows an example content calendar system.

Referring now to FIG. 3, an example content calendar system 300 is shown in accordance with the present disclosure. Content calendar system 300 may represent content calendar system 230 of FIG. 2 and/or content calendar system 111 of FIG. 1. Content calendar system 300 may include: calendar update engine 310, synchronized calendar database 320, user preference database 330, producer content database 340, customized recommendation engine 350, and calendar recommendation engine 360.

Calendar update engine 310 may serve to communicate with a cloud-based calendar host, such as cloud-based calendar host 220 of FIG. 2. Calendar update engine 310 may serve to update stored versions of various cloud-based calendars, each possibly associated with a particular user, stored in synchronized calendar database 320. As a user updates calendar events stored by cloud-based calendar host, the calendar events may be pushed to calendar update engine 310. Alternatively, calendar update engine 310 may periodically, or at least intermittently, poll cloud-based calendar host for calendar events appearing on various users' calendars. Synchronized calendar database 320 may serve to store instances of multiple users' calendars. These calendar instances may be updated by calendar update engine 310. In some embodiments, calendar events added to the calendars stored by cloud-based calendar host are not shared in full with content calendar system 300, possibly for privacy reasons. Rather, only date/time information of these events may be provided to calendar update engine 310. This time information may indicate a start time, duration, and/or an end time of a calendar event but no details as to what the event pertains.

User preference database 330 may store various preferences for users. For a particular user, preferences stored may include: one or more user identifiers (such as for example a username, identifier of the user's television receiver), content preferences, timeslot preferences, types of event preferences, and/or frequency preferences. Other forms of preferences may also be stored as well. User preferences may be based on direct or indirect user input. Direct user input can include the user providing information in response to queries, such as via a user device of user devices 210 of FIG. 2. For example, such a query may be "Do you like romantic comedies?" Indirect user input can be based on the user's viewing habits as observed by television receiver 211. For example, the types of content that the user enjoys may be based on the amount of time the user has spent watching particular television programs and/or particular television channels. Feedback on such preferences may be provided by the television receiver to the television service provider, which may be used to update user preference database 330.

Content preferences, which may be stored as part of user preference database 330 and may or may not be provided directly by the user, may indicate categories of content that the user favors. For example, a content preference may indicate a genre of film that the user prefers. In another example, a content preference may indicate a podcast that the user prefers. Timeslot preferences may or may not be provided directly by the user and may indicate time periods during which the user desires to receive calendar events. These timeslots may be recurring, such as Monday evenings between 7 and 10 PM. Such timeslot preferences may be used to determine when calendar events that recommend content are permitted on the user's cloud-based calendar. For example, if a user works from 9 AM to 6 PM, the user may find it useless and/or annoying to receive calendar events recommending content for viewing at 2 PM. However, if the user has defined weekday evenings between 7 and 10 PM as his preferred timeslot for content-related calendar events, this preference may result in content-related calendar events only being provided for periods of time between 7 and 10 PM during the week. User preference database 330 may also store information on type of event preferences for a user that may or may not be provided directly by the user. Types of events include: Non-television (e.g., movie theater, film festival, opera, theatre) events, on-demand content events and broadcast events. For instance, while a user may be interested in calendar events for content broadcast to his television at home, this user may not be interested in receiving calendar events which involve attendance at a movie theater. Such type of event preferences may be used to further target calendar events to the specific user. Further, user preference database 330 may include frequency preferences that may or may not be provided directly by the user. Frequency preferences may limit the frequency at which recommended events are provided to the cloud-based calendar host for a particular user. For example, while the user may have indicated that he prefers to watch television from 7 until 11 PM on weekdays, a user may find it annoying if the user's calendar is overrun with calendar events for recommended content. The user, via frequency preferences, may limit the number of recommendations provided, such as to once per week, four times per month, or any other rate.

Producer content database 340 may store content that is been received from one or more content producers. This may include the content itself (e.g., the movie), metadata associated with the received content, and one or more personal invitations. Such invitations may be in the form of video with accompanying audio. Metadata may also be associated with the personal invitations. This metadata may indicate the appropriate circumstances under which a version of the personal invitation should be provided to a user's cloud-based calendar. For instance, if it is known that the user is located in Denver, metadata may indicate that a particular personal invitation is intended for presentation to users located in the greater Denver area.

Customized recommendation engine 350 may access synchronized calendar database 320, user preference database 330, and producer content database 340 in order to determine what content should be recommended to the user at what time. Customized recommendation engine 350 may be configured to perform steps such as those detailed in reference to method 600 of FIG. 6. If a piece of content is determined to be recommended, customized recommendation engine 350 may provide information to calendar recommendation engine 360. Calendar recommendation engine 360 may create a calendar event to be transmitted to cloud-based calendar host for inclusion on the user's calendar. This calendar event may include a date, start time, duration, and/or stop time of the content, and/or details about the content such as, for example, a description of the content, the content's title, a link to a webpage about the content. Such a date, start time, duration, and/or stop time may permit the calendar event to be properly placed in the user's cloud-based calendar. The calendar event may also include a personal invitation determined to be appropriate to provide to the user. This calendar event may be transmitted to the cloud-based calendar host for addition to the user's calendar. Once the calendar event has been forwarded to the cloud-based calendar host, the cloud-based calendar host may distribute the calendar event to the user, such as by pushing the calendar event to the user's mobile phone.

Figure 4B:
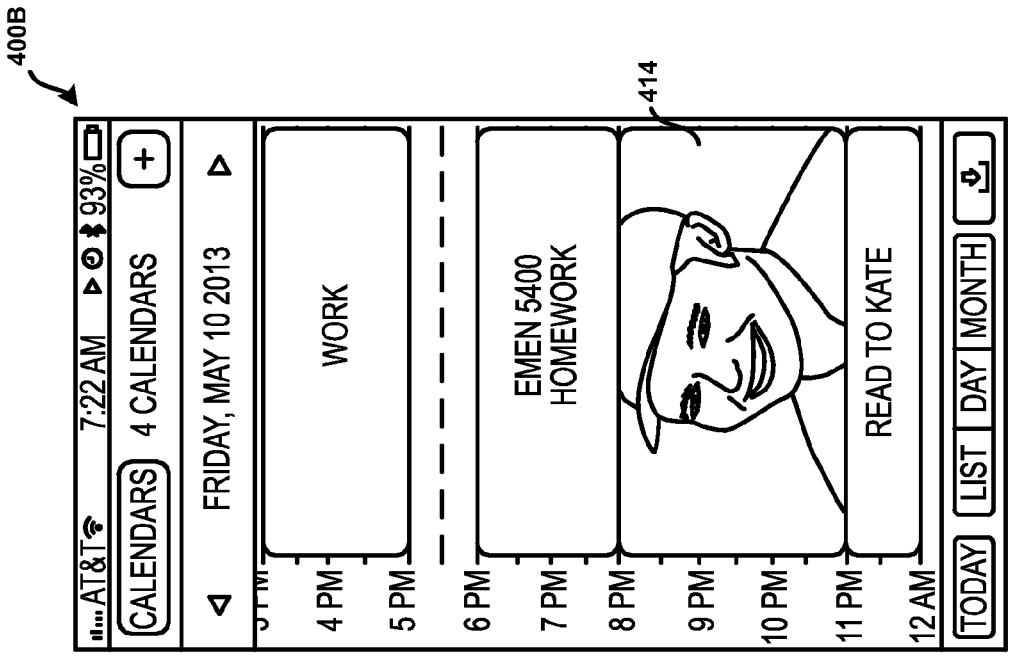
FIGS. 4A and 4B show first and second example entries in a cloud-based calendar.
Figure 4A:
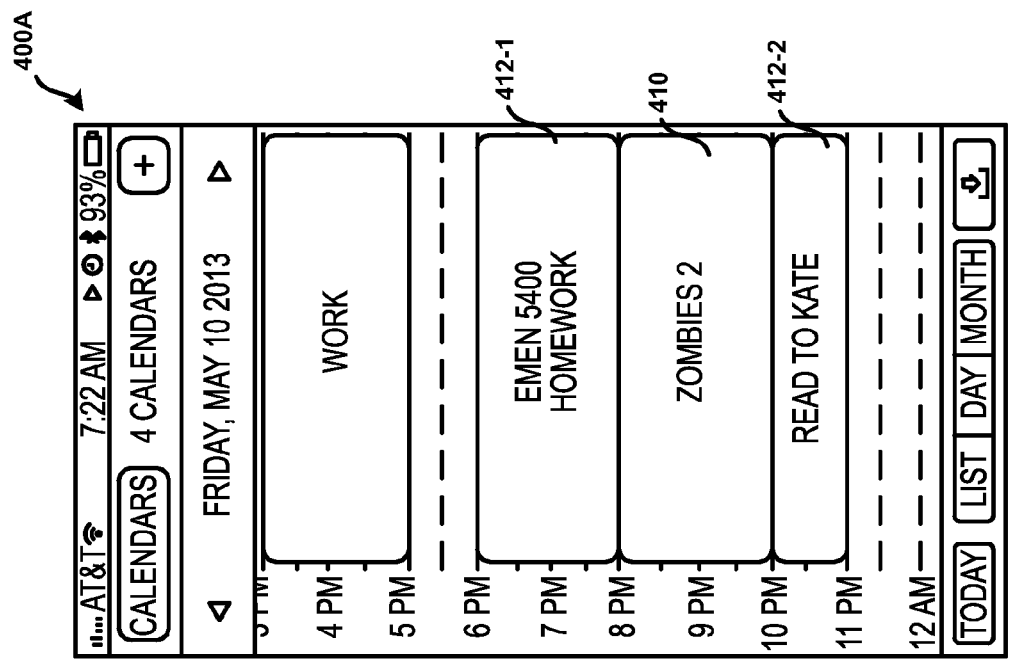

Referring now to FIG. 4, first and second example entries in a cloud-based calendar are shown in accordance with the present disclosure. For example, in example embodiment 400A of FIG. 4A, calendar event 410 has been provided to a user's cloud-based calendar host by a content calendar system, such as content calendar system 300 of FIG. 3, for content called "Zombies 2." Calendar event 410 is presented to the user in relation to other events added by the user (and/or other parties) to the user's calendar. For example, calendar events 412 (412-1 and 412-2) may have been added by the user to remind them what activities should be performed during the indicated time periods.

The "Zombies 2" piece of content may be broadcast content scheduled to be broadcast from 8 to 10 PM on Friday, May 10, 2013. This piece of content may also be on-demand and available to be watched, and possibly purchased, at the user's television receiver, the calendar event serving as a recommendation for when to watch the content. This piece of content may also have already have been recorded by the television receiver from a broadcast, the calendar event serving as a recommendation of when to watch the piece of content. This piece of content may also be as of yet unavailable via the user's television receiver, but could be viewed elsewhere, such as at a movie theatre.

In embodiment 400A, the title of the content is listed in a block of the calendar that indicates the start time, end time, duration, and date (in the header). Selection of calendar event 410 may provide additional details supplied by content calendar system 300, such as: a description of the movie, rating, reviews, pictures, a link to the trailer or an embedded trailer. When calendar event 410 is selected, the user may have the ability to accept or reject the calendar event. If rejected, calendar event 410 may be deleted from the calendar. If accepted, the content calendar system may be notified and/or some other application, which may be executed by the mobile device of the user, may be notified. The user's television receiver may be notified to output for presentation and/or record the piece of content. Other functions may also be possible, such as if calendar event 410 is tied to paid on-demand content, the user may be able to complete the purchase by accepting or otherwise interacting with calendar event 410.

In example embodiment 400B of FIG. 4B, calendar event 414 has been provided to the user's cloud-based calendar host by a content calendar system, such as content calendar system 300 of FIG. 3, for content called "Zombies 2." In embodiment 400B, calendar event 414 is in the form of a personal invitation. This personal invitation may be intended to encourage the user to view the associated piece of content. The personal invitation added to the user's calendar may be based on known characteristics of the user and/or user preferences. The personal invitation of calendar event 414 may include video, such as a short video clip that features an actor or actress of the piece of content inviting the user to view the piece of content. In some embodiments, an image is displayed directly in the user's calendar in the timeslot of calendar event 414. Selection of calendar event 414 may cause a video clip to play. In other embodiments, a link may need to be selected and loaded for a personal video invitation to play. Audio-only and/or image-based invitations are also possible. Besides have the personal invitation, calendar event 414 may function similarly to calendar event 410 of FIG. 4A.

While embodiments 400A and 400B represent a partial day's entry in a user's cloud based calendar, it should be understood that in other embodiments of cloud-based calendar, similar information may be presented in a different format. For instance, information may be rearranged, additional information may be presented, or a subset of the information of FIGS. 4A and 4B may be presented. The illustrated embodiments are intended as examples.

Figure 5:
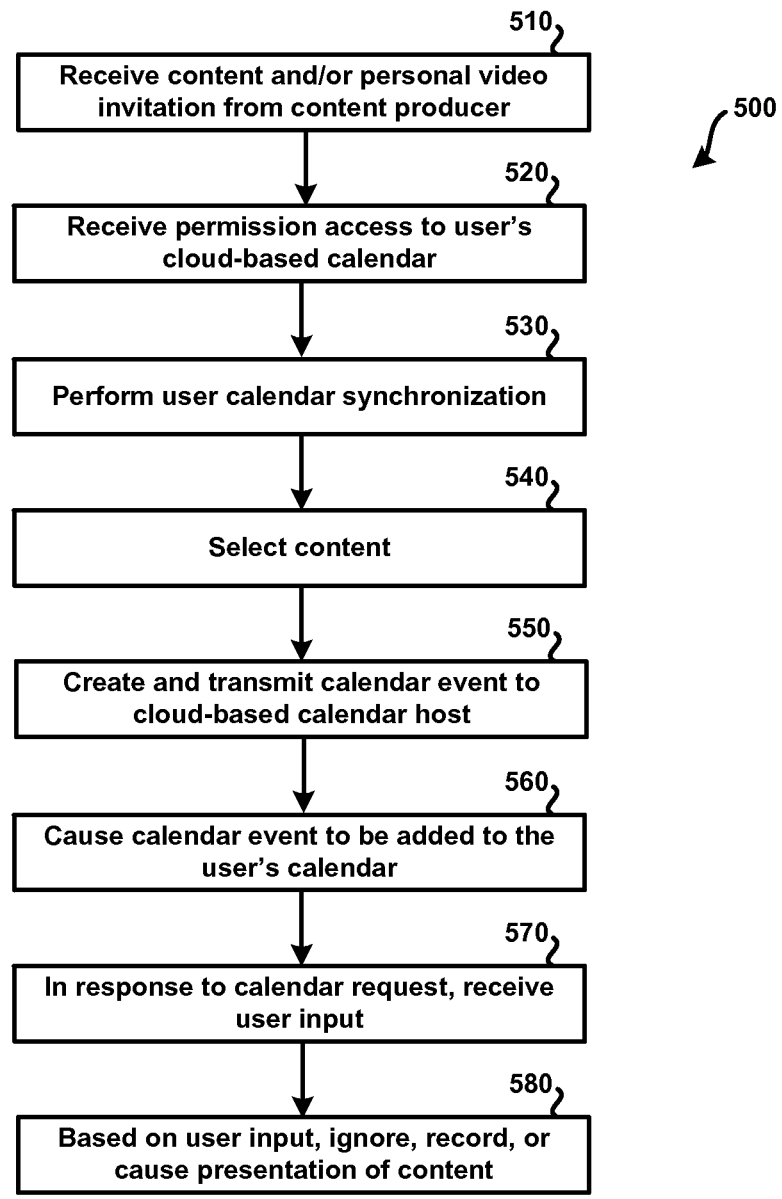
FIG. 5 shows a first example method in accordance with the present disclosure.

Various methods may be performed involving the systems described. For example, referring now to FIG. 5, a first example method 500 is shown in accordance with the present disclosure. In particular, method 500 may be for adding an event to a cloud-based calendar. Steps of method 500 may be performed using computerized devices, such as one or more computers, which may be distributed. For example, at least some steps of method 500 may be performed by content calendar system 300 of FIG. 3, which may include one or more computer systems.

At step 510, content may be received from the content producer. Such content may be stored to producer content database 340 of FIG. 3 or some other storage arrangement. The content producer may be a movie studio, distributor, television network, or some other entity that has the right to distribute content. In addition to receiving the piece of content from the content provider, one or more personal invitations may be received from the content provider. These one or more personal invitations may correspond to the piece of content and may serve as promotional material intended to increase viewership of the piece of content. The one or more personal invitations may include video, audio, images, and/or text. If multiple personal invitations received, each invitation may be targeted to differing audiences. For instance, a personal invitation may be targeted to a particular geographic area or region. Additionally, at step 510, metadata may be received from the content provider. This metadata may indicate one or more characteristics of the piece of content, including indications of: actors, actresses, director, ratings, reviews, description, content duration, and/or other characteristics of the piece of content as desired. Similarly, the metadata may include information about each personal invitation. For example, the metadata for particular personal invitation may indicate a geographic region and/or the actor/actress talking in the personal invitation.

Permission may be required from the user for the content calendar system to access the user's cloud-based calendar. Such permission may be received at step 520. The permission may be provided by the user to the cloud-based calendar host, or from the user to the content calendar system, which can in turn provide an indication of the permission (e.g., authentication information of the user) to the cloud-based calendar host. For instance, the user may provide the cloud-based calendar host with authorization to provide calendar events to the content calendar system. In other embodiments, the user may have provided the content calendar system with authentication information sufficient for the content calendar system to access the user's calendar posted by the cloud-based calendar host. Following step 520, it may be possible for the content calendar system to determine timeslots of when the user is busy and free. As the user makes modifications to the cloud-based calendar, the content calendar system may receive updates via push from the cloud-based calendar host or may periodically request updates from the cloud-based calendar host via pull.

At step 530, calendar synchronization may occur between the cloud-based calendar host and the content calendar system for the user's calendar. The synchronization process may permit the content calendar system access to determine calendar events already present on the user's calendar. For example, these calendar events may include one or more calendar events that were added by the user or someone else with permission to access the user's calendar, such as the user's secretary. In some embodiments, the content calendar system can request synchronization from the cloud-based calendar host. In other embodiments, the cloud-based calendar host may push calendar information to the content calendar system. In some embodiments, the content calendar system maintains an up-to-date version of the user's calendar one week into the future. In some embodiments this may be a configurable setting. Referring to content calendar system 300 of FIG. 3, synchronized calendar database 320 may be used to store the upcoming week of the user's cloud-based calendar.

At step 540, content for recommendations to the user may be selected. The content selected at step 540 by the content calendar system may take into account: the user's preferences, the user's viewing habits, and/or events already present on the user's calendar. Recommendations made at step 540 may be determined to be possible to watch in the user's available time (that is, in unscheduled timeslots on the user's calendar). Step 540 is detailed further in relation to method 600 of FIG. 6.

At step 550, the calendar request for the content selected at step 540 may be sent to the cloud-based calendar host. Referring additionally to FIG. 3, calendar recommendation engine 360 may compose and transmit the calendar event to the user's calendar at the cloud-based calendar host. The calendar request transmitted at step 550 may include: date, start time, stop time, duration, personal invite which may be a personal video invite, details about the content, a content identifier, which may permit the content to be identified from other content provided by the television service provider, and/or a user identifier such as, for example, a username or other identifier that can be used to identify the user as a customer of the television service provider. This calendar invite may appear on the user's cloud-based calendar until the user either accepts, rejects, or takes some other action on the calendar invite. When the calendar request is sent to the user's cloud-based calendar, the user may receive a notification of the calendar invite at a computerized device with which the user interacts with the cloud-based calendar. The transmission of the calendar event to the cloud-based calendar host of step 550 may result in the calendar event being added to the user's cloud-based calendar at step 560. Subsequently, whenever the user accesses their cloud-based calendar, the user may view the calendar event, possibly including a video serving as a personal video invitation, sent by the content calendar system at step 550. The calendar event may be configured to request user input from the user following viewing of the personal invitation. For instance, after watching a personal video invitation, the user may be requested to indicate whether or not the calendar event is desired or not, for example the user can accept or reject the calendar event.

In response to the calendar request, user input may be received at step 570. The input received at step 570 may be received by the cloud-based calendar host and/or by the content calendar system. If the user has accepted the calendar event, the calendar event may remain scheduled on the user's calendar at step 580. Further, data may be passed along to the content calendar system that indicates the user has accepted the calendar event. Data may be transmitted to the user's television receiver (e.g., via satellite) that indicates the content is to be recorded (e.g., via a timer) or is to be tuned to and output for presentation at the time indicated by the calendar event at step 580. In some embodiments, rather than the content calendar system providing such an indication to the television receiver, an alternate application available on a user device, such as a streaming media player may transmit commands to the television receiver (e.g. via the Internet), content calendar system, or other television service provider system. If the record/output commands are to be transmitted by the content calendar system to the television receiver via satellite, the message may be addressed specifically to the user's television receiver, such that other television receivers receiving the message ignore it.

If, instead of accepting the calendar event, the user rejects or denies the calendar event, the calendar event may be deleted from the user's calendar and no action may be taken in response to the calendar event at the user's television receiver at step 580. For instance, the piece of content may not be recorded by the user's television receiver. Such a rejection may be relayed to the content calendar system at step 570 by the cloud-based calendar host or may be received directly by the content calendar system from the particular device that the user is using to interact with the cloud-based calendar.

In some embodiments, user input may cause an alternate application, such as a media player, to begin playing the content indicated by the calendar event at step 580. For example, the user may be so interested in the content indicated in the calendar event that instead of waiting for the timeslot recommended as part of the calendar event, the user may desire to watch the content immediately. Such a choice may only be available if the content has already been recorded by the user's television receiver or is available on-demand. If available, such user input may cause a media player application to begin streaming or otherwise playing the content selected at step 540. An indication of this user input requesting immediate playback may be received at step 570 by the content calendar system either directly from the device being used by the user to interact with the cloud-based calendar or may be provided to the content calendar system via the cloud-based calendar host. Following such user input, the content may be streamed to the user device at step 580 by the television service provider, from the user's television receiver, or from some alternate source.

User input may also involve the user rearranging the calendar event at step 570. For instance, while the user may be interested in the content recommended by the calendar event, the timeslot recommended as part of the calendar event may not be ideal for the user. The user may be permitted to drag or otherwise move the calendar event to some other time. How the user is permitted to drag the calendar event may be based on the type of content. For instance, if the content is a broadcast event scheduled to air at the timeslot indicated by the calendar event, the user may only be permitted to drag the calendar event into the future, thus allowing the content to be recorded by the television receiver at the broadcast time and then watch for playback by the user at the new timeslot selected by the user. Such an action may only be permissible if the user's television receiver is capable of recording the content. If not, the user may be prohibited from moving the calendar event. If the content is on-demand or already recorded by the user's television receiver, the user may be able to move the calendar event into the past or future from the timeslot recommended as part of the calendar event. If the content is some other form of event, such as a movie playing at a movie theater, the user may only be permitted to move calendar event to another time at which the content is playing at the movie theater (e.g., corresponding to another showtime).

At step 580, based on the user input received, the television receiver of the user, the content calendar system, and/or the cloud-based calendar host may perform one or more actions as detailed above. For instance, based on the user input, the cloud-based calendar host may maintain or delete the calendar invite. The calendar invite has been accepted, the television receiver of the user may be configured to record or output for presentation the content. The content calendar system may be informed of the user's selection and may cause the television receiver to perform such functions and/or the user's preferences may be updated. Statistics may be maintained by the content calendar system on the success rate of calendar events, and more specifically, one calendar events that include personalized invitations.

While method 500 focuses on a particular user, it should be understood that method 500 may be performed for a large number of users, each maintaining a personal calendar at various cloud-based calendar hosts. Each of these users may be receiving and responding to calendar events specifically targeted to the user based on their preferences, events already present in their cloud-based calendar, and/or viewing habits.

Figure 6:
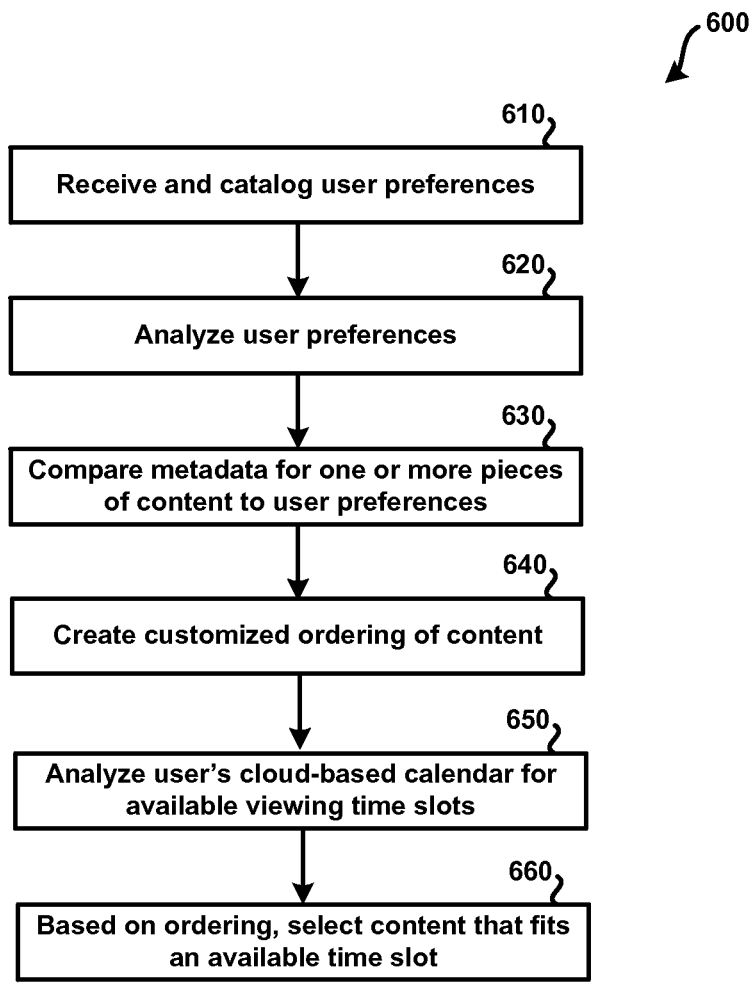
FIG. 6 shows a second example method in accordance with the present disclosure.

Referring now to FIG. 6, a second example method 600 is shown in accordance with the present disclosure. In particular, method 600 may be for selecting content for addition to a cloud-based calendar. Steps of method 600 may be performed using computerized devices, such as one or more computers, which may be distributed. For example, at least some steps of method 600 may be performed by content calendar system 300 of FIG. 3, which may include one or more computer systems. More specifically, some or all of method 600 may be performed as part of step 540 of FIG. 5. Steps of method 600 may be performed by a customized recommendation engine, such as customized recommendation engine 350 of content calendar system 300 of FIG. 3.

At step 610, user preferences may be received and cataloged. The user preferences received at step 610 may be in response to queries posed to the user regarding: content preferences, timeslot preferences, types of event preferences, and/or frequency preferences. In some embodiments, at least some of the user preferences may be derived indirectly from viewing habits of the user measured by the user's television receiver. These viewing habits may be passed back to the television service provider via a network connection. The user preferences received at step 610 may include an indication from the user of one or more timeslots during which the user desires to receive calendar events for content. Calendar events for content may only be permitted to be scheduled during the timeslots indicated by the user. Further, these timeslots may only be used when another event is not already scheduled for the timeslot in the user's calendar. The user preferences received by the content calendar system at step 610 may be stored to a database that maintains such preferences for multiple users. For example, user preference database 330 of FIG. 3 may be used to store user preferences.

At step 620, for particular user, user preferences may be analyzed to determine whether a calendar invite for content should be sent to the user, for when the calendar invite should be sent to the user. For example, the analysis of step 620 may determine whether the user is currently eligible to receive the calendar invite based on the user's specified frequency preference and the user's type of event preference. At step 630, metadata for pieces of content may be compared to the user preferences. Metadata for a particular piece of content may be compared to the user's preferences to determine if the piece of content is a good match for the user. Based on the comparison, a score may be assigned to the piece of content and stored.

At step 630, multiple sets of metadata for multiple pieces of content may be compared to the user's preferences with a score being determined for each. Following the comparison of step 630, a customized order of content may be created at step 640 that ranks the pieces of content from most desirable to least desirable according to the determined scores. In some embodiments, rather than establishing a listing of multiple pieces of content that the user is expected to like based on the user's preferences, a single piece of content may be evaluated to determine whether or not the content is likely to be liked by the user. This single piece may be assessed by determined if its score is above a predefined threshold: if so, the content may be included in a calendar event sent to the user, if not, the piece of content may not be recommended in a calendar invite.

At step 650, the user's cloud-based calendar may be analyzed for available viewing timeslots. An available viewing timeslot may be a period of time on the user's calendar that is not occupied by one or more other calendar events. For example, referring additionally to embodiment 400A of FIG. 4A, the time period from 5 PM until 6 PM could be considered an available viewing timeslot. However, from 6 PM until 8 PM would not be considered an available viewing timeslot because user-added calendar event 412-1 is present. The user's calendar may be retrieved from synchronized calendar database 320 for such analysis at step 650. The user's calendar may only be analyzed during time periods that corresponds to the user's timeslot preferences indicated in the user's preferences. For example, a user may indicate that he desires calendar invites for content only on weekdays between 7 PM and 11 PM. Therefore, the remainder of the user's calendar may not be analyzed for available viewing timeslots; only weekdays from 7 PM until 11 PM may be analyzed for available viewing timeslots. When an available viewing timeslot is determined at step 650, a piece of content may be selected for recommendation in a calendar invite for this timeslot.

An analysis may be performed at step 660 to compare the ordering of customized content at the available timeslot. The content may be analyzed to determine whether its duration will fit in the available viewing timeslot. For example, one piece of metadata that may be associated with pieces of content is an indication of duration. Therefore, the duration of the piece of content may be required to be equal to or less than the duration of the available viewing time slot. The analysis at step 660 may include first analyzing the most desirable piece of content. If the most desirable piece of content is the same or less in duration than the available timeslot. The most desirable piece of content may be indicated in the calendar event. If the most desirable piece of content does not fit in the available viewing timeslot, the next most desirable piece of content may be analyzed, and so on. Once a piece of content has been included in a calendar invite, that piece of content may be removed from the ordering of customize content created at step 640 such that it is not recommended again in the future. For future available timeslots, the customized ordering of content may be reused to suggest other pieces of content. Periodically, the customized ordering of content may be re-created to incorporate new pieces of content.

Following the analysis of step 660, a piece of content that fits in the available timeslot and is desired by the user according to the user's preferences may be selected. This piece of content may then have a calendar invite created for the available time slot and transmitted to the user's cloud-based calendar (such as calendar event 410 of FIG. 4A). The personal invite associated with the piece of content may be accessed from a producer content database, such as producer content database 340 of FIG. 3, and embedded in or linked to in the calendar invite (such as calendar event 414 of FIG. 4B). If multiple personal invites are present for the piece of content in producer content database 340, based on characteristics of the user, such as those indicated in the stored user preferences, a particular personal invite of the multiple stored personal invites may be selected for inclusion in the calendar invite.

Figure 7:
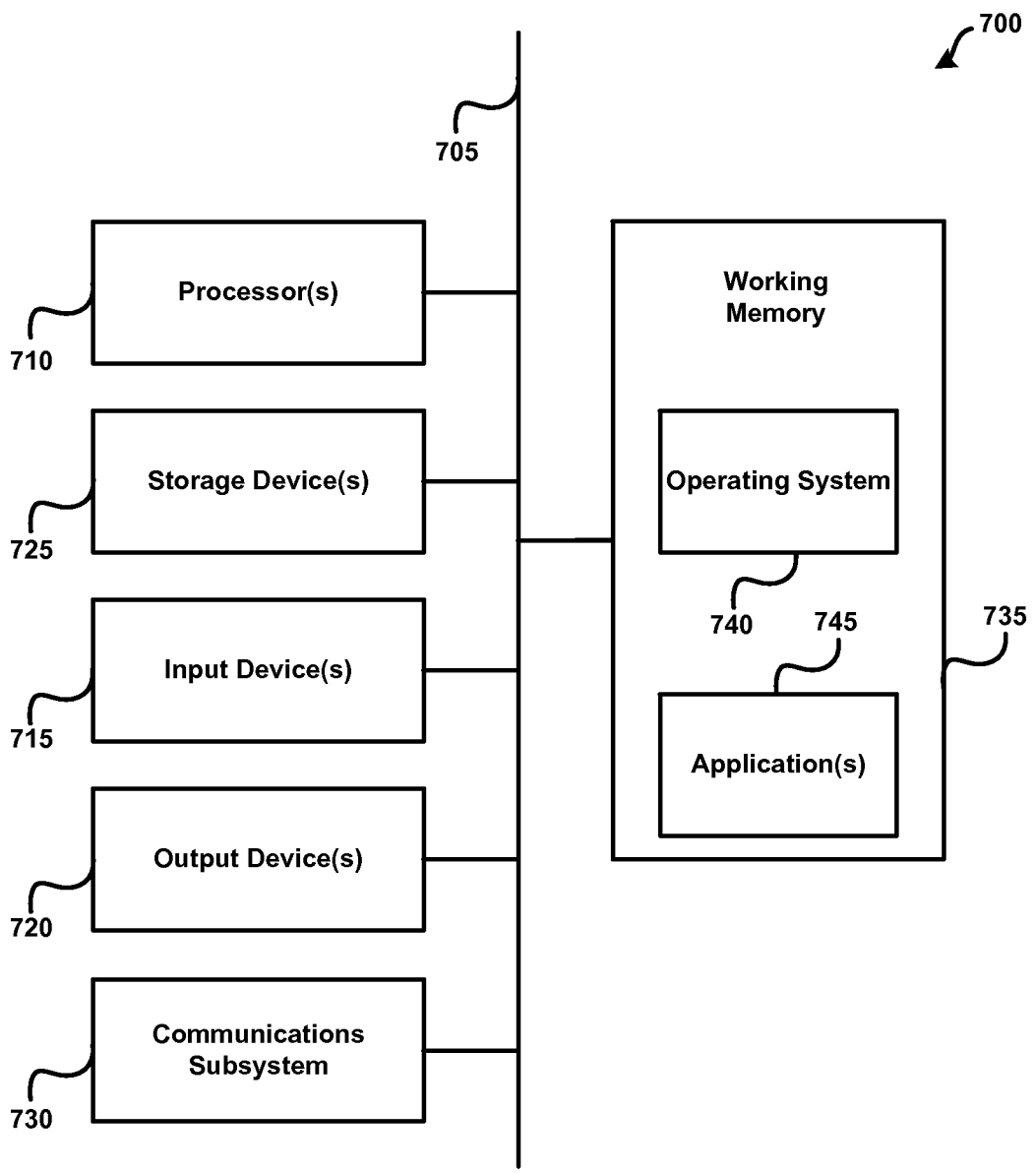
FIG. 7 shows an example computer device or system.

FIG. 7 shows an example computer device or system 700 in accordance with the present disclosure. A computer system as illustrated in FIG. 7 may be incorporated as part of the previously described computerized devices, such as the content calendar systems, the television service provider systems, the television receivers, the user devices, the cloud-based calendar hosts, and the content producer systems. Further, components of various systems, such as components of content calendar system 300 of FIG. 3 may be performed by multiple computer systems and/or computerized components, which may be distributed. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any non-transitory medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for adding an event to a cloud-based calendar, comprising:
    receiving a calendar synchronization communication, wherein the calendar synchronization communication comprises a plurality of unscheduled time periods;
    identifying a piece of content having a playback time that is not greater than an unscheduled time period of the plurality of unscheduled time periods;
    creating a calendar event for the piece of content, wherein:
        the calendar event is based on the piece of content and the playback time; and
        the calendar event comprises a targeted invitation to view the piece of content, the targeted invitation having been selected from a plurality of invitations to target a user of the cloud-based calendar and the targeted invitation comprising a video clip; and
    causing the calendar event to be added to the cloud-based calendar.

2. The method of claim 1, further comprising:
    receiving, from a content provider, a personal video invitation corresponding to the piece of content, the personal video invitation serving as the targeted invitation; and
    causing the personal video invitation to be added to the cloud-based calendar as part of the calendar event.

3. The method of claim 1, further comprising:
    receiving user preferences, wherein the user preferences comprise one or more recurring candidate time periods during which a user desires to watch content.

4. The method of claim 3, wherein the unscheduled time period overlaps a candidate time period of the one or more recurring candidate time periods.

5. The method of claim 1, further comprising selecting the piece of content from one of: broadcast content; non-television content; and on-demand content.

6. The method of claim 5, further comprising:
in response to causing the calendar event to be added to the cloud-based calendar, receiving a response to the calendar event; and
causing a television receiver to record the piece of content based on the response to the calendar event.

7. The method of claim 5, further comprising:
in response to causing the calendar event to be added to the cloud-based calendar, receiving a response to the calendar event; and
causing a television receiver to output for presentation the piece of content based on the response to the calendar event.

8. A method for creating a calendar event, comprising:
comparing metadata associated with particular television programming against user-specific preferences for scheduling television programming-related calendar events;
assigning, based on the comparing, a ranking value to the particular television programming; and
creating a calendar event for the particular television programming when the ranking value at least exceeds a particular threshold value, wherein:
duration of the calendar event is based on duration of the particular television programming; and
the calendar event comprises a targeted invitation to view the particular television programming, the targeted invitation having been selected from a plurality of invitations to target a user of the cloud-based calendar and the targeted invitation comprising video.

9. The method of claim 8, further comprising adding the calendar event to a particular cloud-based calendar upon detecting an acceptance of a calendar invite that is associated with the calendar event.

10. The method of claim 8, further comprising scanning a particular cloud-based calendar for unscheduled time periods to schedule the calendar event based on the user-specific preferences.

11. The method of claim 8, further comprising cataloging user-specific preference information based on input provided by a particular user.

12. The method of claim 8, further comprising cataloging user-specific preference information based on input provided by a television receiver that monitors programming selections.

13. The method of claim 8, further comprising sending a calendar invite that is associated with the calendar event and that requests acceptance of the calendar event.

14. The method of claim 8, further comprising generating a notification reminder for presentation by a display device at a time prior to broadcast of the television programming.

15. A computing system, comprising:
one or more processors; and
a memory communicatively coupled with and readable by the one or more processors and having stored therein processor-readable instructions that, when executed by the one or more processors, cause the one or more processors to:
perform a calendar synchronization with a cloud-based calendar system, wherein the calendar synchronization identifies a plurality of unscheduled time periods; in a cloud-based calendar of a user;
receive a calendar event for a piece of content from the cloud-based calendar system, wherein:
the calendar event is based on the piece of content and a playback time of the piece of content not being greater than an unscheduled time period of the plurality of unscheduled time periods; and
the calendar event comprises a targeted invitation to view the piece of content, the targeted invitation having been selected from a plurality of invitations to target the user of the cloud-based calendar and the targeted invitation comprising a video clip; and
output for presentation, via a display, a cloud-based calendar that includes:
at least one non-television-related calendar event to remind a particular individual of a non-television-related activity; and
the calendar event to remind the particular individual of the piece of content available at a time associated with the calendar event, the calendar event comprising a targeted invitation to view the content, the targeted invitation having been selected from a plurality of invitations to target the user of the cloud-based calendar and the targeted invitation comprising a video clip.

16. The computing system of claim 15, wherein the memory having further stored therein processor-readable instructions which, when executed by the one or more processors, cause the one or more processors to:
output for presentation by the display at least one detail associated with the content in response to selection of the calendar event.

17. The computing system of claim 15, wherein the memory having further stored therein processor-readable instructions which, when executed by the one or more processors, cause the one or more processors to:
output for presentation via the display the video clip associated with the content in response to selection of one of the calendar event and a link contained within the at least one television-related calendar event.

18. The computing system of claim 15, wherein the memory having further stored therein processor-readable instructions which, when executed by the one or more processors, cause the one or more processors to:
output for presentation via the display the content made available at the time associated with the calendar event.

19. The computing system of claim 15, wherein the memory having further stored therein processor-readable instructions which, when executed by the one or more processors, cause the one or more processors to:
output for presentation via the display the content made available at a time different than the time associated with the calendar event.

20. The computing system of claim 15, wherein the memory having further stored therein processor-readable instructions which, when executed by the one or more processors, cause the one or more processors to:
send a command to the television receiver to record the content at the time associated with the calendar event.

* * * * *